US008146899B2

United States Patent
Hiser

(10) Patent No.: US 8,146,899 B2
(45) Date of Patent: Apr. 3, 2012

(54) ISOLATION SYSTEM FOR A SEAT OR THE LIKE, AND VEHICLE INCORPORATING SAME

(75) Inventor: Nicholas R. Hiser, Beatrice, NE (US)

(73) Assignee: Exmark Manufacturing Company, Incorporated, Beatrice, NE (US)

( * ) Notice: Subject to any disclaimer, the term of this patent is extended or adjusted under 35 U.S.C. 154(b) by 1048 days.

(21) Appl. No.: 12/017,417

(22) Filed: Jan. 22, 2008

(65) Prior Publication Data

US 2009/0184448 A1 Jul. 23, 2009

(51) Int. Cl.
*F16F 7/00* (2006.01)

(52) U.S. Cl. .................. 267/141.3; 267/140.3; 267/131; 267/133; 248/636

(58) Field of Classification Search ............... 267/140.4, 267/153, 293, 294, 131, 133; 248/632, 634, 248/636, 638; 297/335; 180/89.14
See application file for complete search history.

(56) References Cited

U.S. PATENT DOCUMENTS

| | | | |
|---|---|---|---|
| 2,303,567 A | 12/1942 | McWhorter et al. | |
| 2,538,954 A * | 1/1951 | Efromson et al. | 267/141.3 |
| 2,900,161 A * | 8/1959 | Crede | 248/573 |
| 2,911,207 A * | 11/1959 | Coble, Jr et al. | 267/153 |
| 2,987,291 A * | 6/1961 | Dyson | 267/140.3 |
| 3,177,962 A | 4/1965 | Bailey | |
| 3,358,958 A * | 12/1967 | La Russa | 248/559 |
| 3,770,235 A | 11/1973 | Klapproth et al. | |
| 4,057,214 A | 11/1977 | Harder, Jr. | |
| 4,062,585 A | 12/1977 | Herring, Jr. | |
| 4,215,841 A | 8/1980 | Herring, Jr. | |
| 4,235,471 A | 11/1980 | Tengler | |
| 4,286,777 A * | 9/1981 | Brown | 267/294 |
| 4,351,556 A | 9/1982 | Worringer | |
| 4,429,427 A | 2/1984 | Sklar | |
| 4,477,050 A | 10/1984 | Thompson et al. | |
| 4,537,382 A * | 8/1985 | Beck | 248/568 |
| 4,711,423 A * | 12/1987 | Popper | 248/635 |
| 4,944,554 A | 7/1990 | Gross et al. | |
| 5,769,492 A | 6/1998 | Jensen | |
| 5,915,662 A * | 6/1999 | Itakura et al. | 248/561 |
| 6,019,422 A | 2/2000 | Taormino et al. | |
| 6,042,093 A | 3/2000 | Garelick | |
| 6,088,689 A | 7/2000 | Kohn et al. | |
| 6,572,071 B1 | 6/2003 | Tsai | |
| 6,669,293 B2 * | 12/2003 | Moore | 297/335 |

(Continued)

OTHER PUBLICATIONS

"Document 1," 2 pictures of a Grasshopper Model 620 Mower illustrating seat suspension system, The Grasshopper Company, Moundridge, Kansas. Product introduced on or before Jan. 2, 2007; 1 pg.

(Continued)

*Primary Examiner* — Christopher Schwartz
(74) *Attorney, Agent, or Firm* — Mueting, Raasch & Gebhardt, P.A.

(57) ABSTRACT

An isolation system for use in damping and isolating low frequency oscillations and shock loads between two members. An exemplary application is a seat isolation system for use with a vehicle such as a lawn mower. The seat isolation system may include two or more isolators interposed between a chassis of the vehicle, and a seat (e.g., operator's seat). The isolators may permit attenuation of shock or low frequency oscillation inputs via damping and isolation in both vertical and horizontal (fore-and-aft and side-to-side) directions. In some embodiments, the isolators include an elastomeric element that provides the seat with six degrees of freedom.

23 Claims, 8 Drawing Sheets

U.S. PATENT DOCUMENTS

| | | |
|---|---|---|
| 6,688,689 B1 | 2/2004 | Thorn |
| 6,719,258 B2 | 4/2004 | Bryngelson et al. |
| 6,866,340 B1 | 3/2005 | Robertshaw |
| 6,988,703 B2 | 1/2006 | Ropp |
| 7,044,553 B2 | 5/2006 | Ropp |
| 7,882,914 B2 * | 2/2011 | Scheele et al. ............. 180/89.14 |
| 7,967,282 B2 * | 6/2011 | Boyd et al. .................... 267/293 |
| 2005/0082897 A1 | 4/2005 | Ropp et al. |
| 2005/0279910 A1 * | 12/2005 | Huprikar et al. ............. 248/636 |
| 2005/0285006 A1 | 12/2005 | Koutsky et al. |

OTHER PUBLICATIONS

"Bonded Tube Mounts: HR Series," [online]. [retrieved on Apr. 28, 2008].Barry Controls Product Catalog: HR Series, Retrieved from the Internet:<URL:http://www.barrycontrols.com/defenseandindustrial/productselectionguide/data/HRSeries.aspx>; 2004; 1 pg.

* cited by examiner

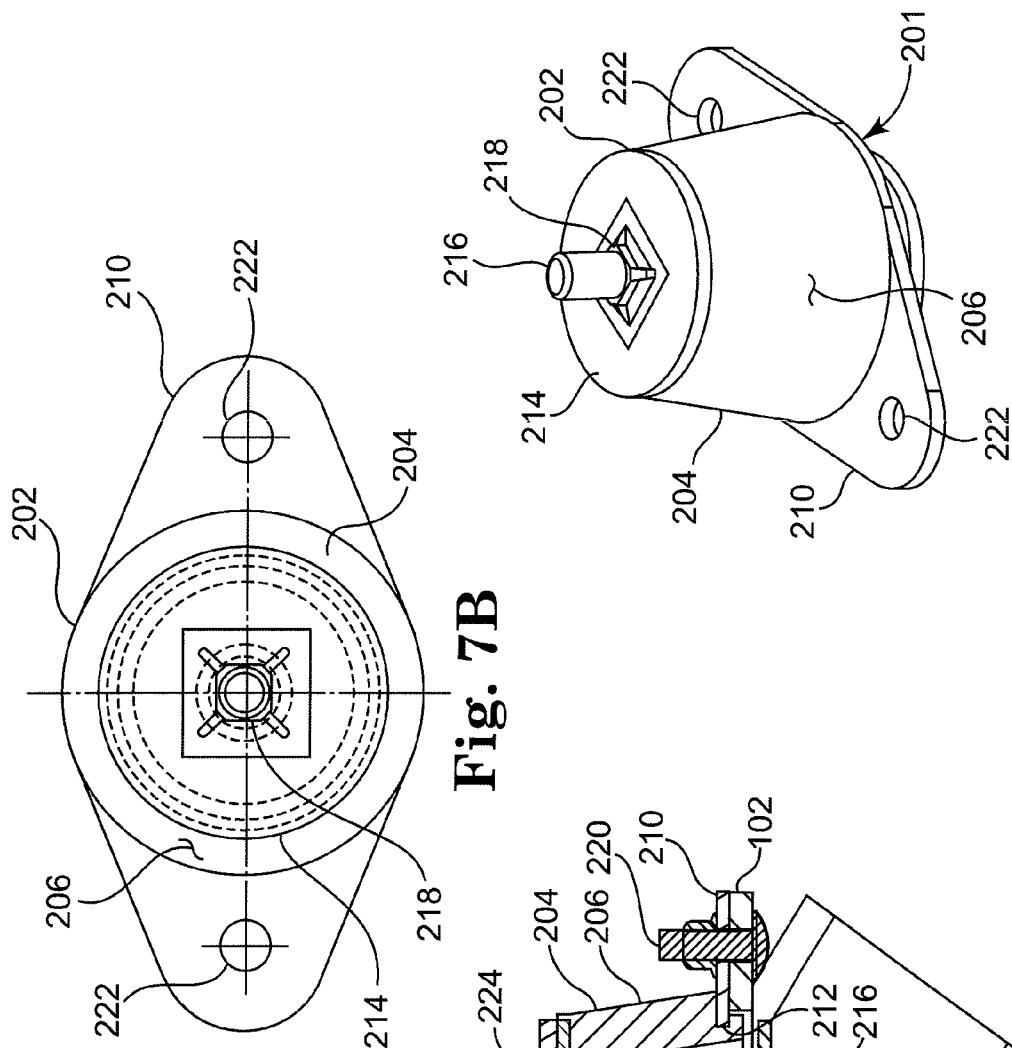
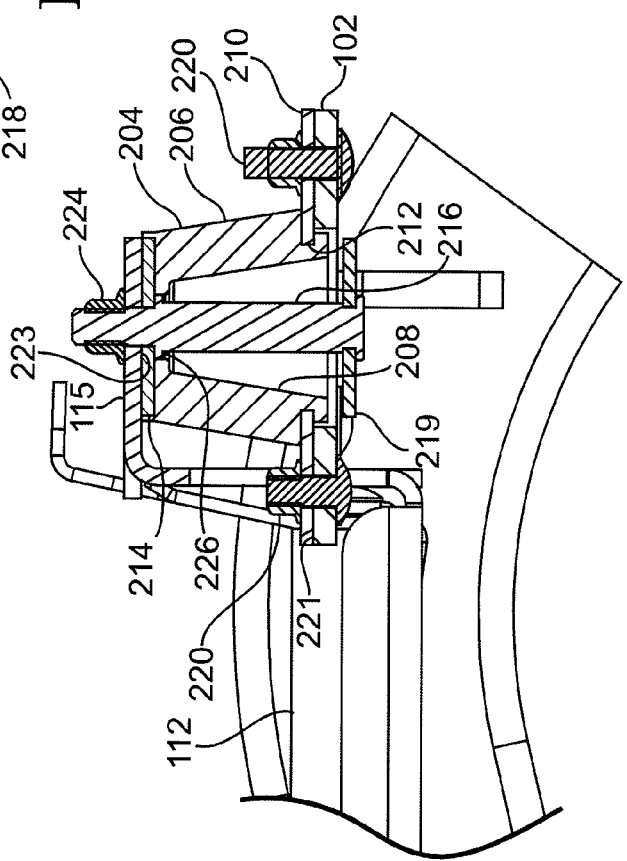
Fig. 7A
Fig. 7B
Fig. 7C

ISOLATION SYSTEM FOR A SEAT OR THE LIKE, AND VEHICLE INCORPORATING SAME

TECHNICAL FIELD

The present invention relates generally to vehicles such as riding lawn mowers and, more particularly, to an isolation system for use with a vehicle subsystem (e.g., a seat system) that attenuates or dissipates shock and low frequency oscillations.

BACKGROUND

Seat suspension systems for isolating a rider from vibration are known. For example, riding lawn mowers may include a seat having a transverse hinged support that permits the seat to pivot about a forwardly positioned transverse axis. The back of the seat may then rest against the mower frame on springs or the like. Such a configuration may assist in attenuating and/or damping vertical oscillations that could otherwise propagate through the mower chassis to the seat.

While such a construction may be advantageous in isolating the seat from chassis vibrations generally in the vertical direction, it typically does not provide the seat with additional degrees of freedom, e.g., horizontal fore-and-aft/side-to-side translation. As mowers and other utility vehicles often operate on undulating terrain, isolation of horizontal oscillations may assist with, for example, improving operator comfort.

While vehicle seats have been developed with various mechanisms for providing such additional degrees of freedom, many implementations suffer from high cost, a large space requirement, and/or increased complexity. For example, some seat suspension mechanisms designed typically for enclosed cab operation may have components in sliding/rolling contact with one another to provide some degree of horizontal seat movement. However, such systems may be ill-suited for use in exposed, dusty environments such as may exist during mowing. For instance, as one can appreciate, dirt deposits between mating surfaces of constantly sliding/rolling parts may result in unintended wear and/or friction problems, particularly after extended periods of operation.

As a result of these drawbacks, many conventional mower seat suspension systems focus on dissipation or attenuation of low frequency oscillations primarily in the vertical direction. While effective, such systems do not address oscillations in other, e.g., horizontal, directions that may result from normal mower operation.

SUMMARY

The present invention may overcome these and other issues with suspension systems by providing isolation systems for a seat or the like, as well as vehicles incorporating such systems, that are operable to attenuate or dissipate low frequency oscillations and shock loads in multiple directions including, for example with a seat isolation system, directions within a horizontal plane. In some embodiments, the seat suspension system may provide the seat with six degrees of freedom (e.g., translation along, and pivoting about, three mutually perpendicular axes or any axis between).

In one embodiment, an isolation system for isolating a first member from a second member is provided. The system includes two or more isolators interposed between the first member and the second member, wherein each isolator includes a tapered elastomeric tubular body. The isolation system defines an axial stiffness and a radial stiffness of a different value than the axial stiffness, wherein the radial stiffness of the isolation system is about 100 pounds-force/inch to about 300 pounds-force/inch.

In another embodiment, a vehicle is provided including a chassis supporting a prime mover operatively powering one or more drive wheels, wherein the chassis includes three or more attachment surfaces. A seat is also provided and includes: an upper seating surface; and a lower receiving surface proximate the attachment surfaces of the chassis. A seat isolation system is also provided and includes an isolator interposed between each attachment surface of the chassis and the receiving surface of the seat, wherein each isolator includes a unitary, elastomeric body. A stiffness of the seat isolation system in all horizontal directions is about 100 pounds-force/inch to about 300 pounds-force/inch. Moreover, the seat isolation system is configured to dissipate oscillations in the horizontal directions of about 5 Hz to about 20 Hz that would otherwise propagate to the upper seating surface.

In yet another embodiment, a riding lawn mower is provided that includes a mower chassis supporting a prime mover operatively powering one or more drive wheels and a cutting deck, wherein the chassis includes four attachment surfaces. A seat is also provided and includes a receiving surface proximate to, and offset from, each of the attachment surfaces of the chassis. Further provided is a seat isolation system that includes an isolator interposed between each attachment surface of the chassis and the corresponding receiving surface of the seat. Each isolator includes a unitary, elastomeric tubular body that is frusto-conical in shape. The seat isolation system is configured to dissipate oscillations in a horizontal plane ranging from about 5 Hz to about 20 Hz that would otherwise propagate from the chassis to the seat.

The above summary is not intended to describe each embodiment or every implementation of the present invention. Rather, a more complete understanding of the invention will become apparent and appreciated by reference to the following Detailed Description of Exemplary Embodiments and claims in view of the accompanying figures of the drawing.

BRIEF DESCRIPTION OF THE VIEWS OF THE DRAWING

The present invention will be further described with reference to the figures of the drawing, wherein:

FIGS. 7A-7D illustrate an isolator for use with the system of FIG. 1, wherein: FIG. 7A is a perspective view; FIG. 7B is a top plan view; FIG. 7C is a section view taken along line 7C-7C of FIG. 4 with some structure removed for clarity; and FIG. 7D is a partial section view.

Figure 1:
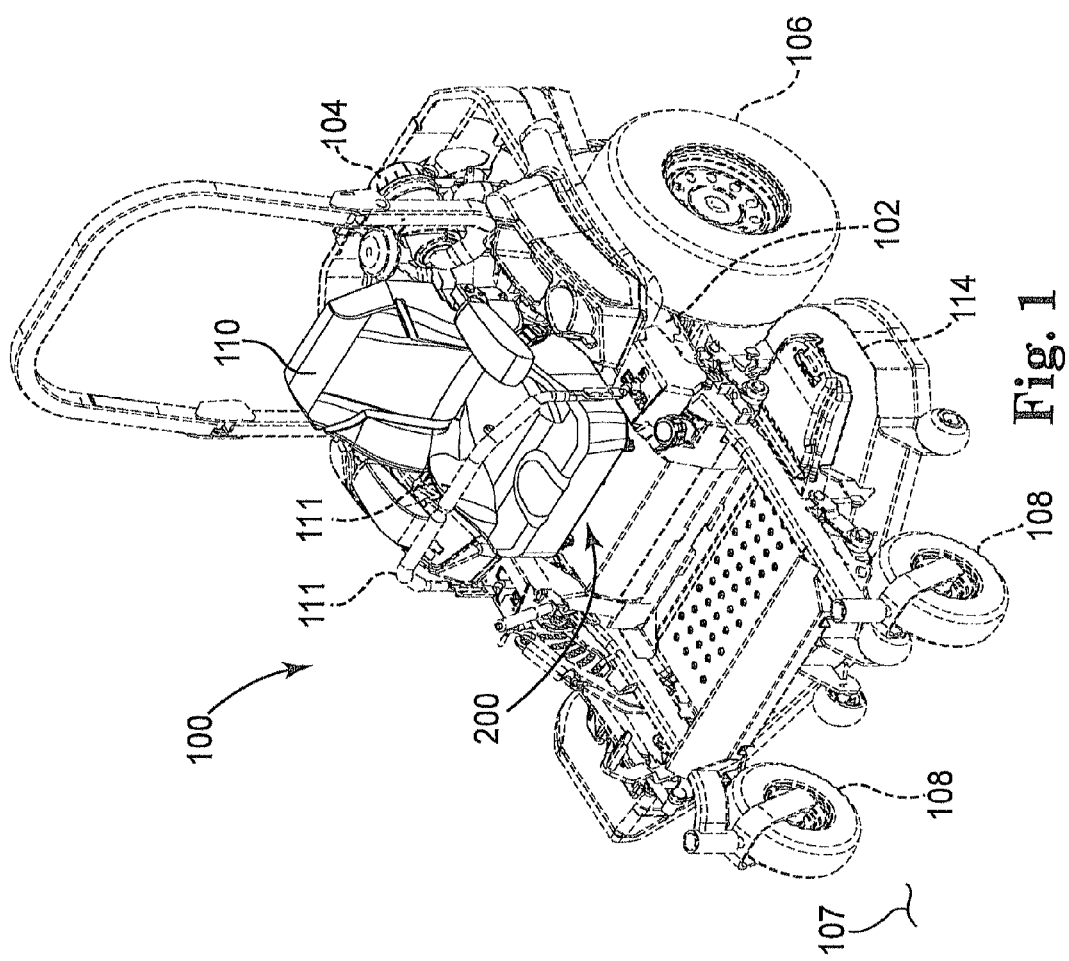
FIG. 1 illustrates a perspective view of a vehicle (e.g., utility vehicle such as a zero-radius-turning riding lawn mower having a seat) incorporating an isolation system, e.g., a seat isolation system, in accordance with one embodiment of the invention.

The figures are rendered primarily for clarity and, as a result, are not necessarily drawn to scale.

DETAILED DESCRIPTION OF EXEMPLARY EMBODIMENTS

In the following detailed description of illustrative embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the instant invention.

Generally speaking, embodiments of the present invention are directed to isolation systems and to vehicles (e.g., riding lawn mowers) incorporating the same. In the illustrated embodiment, the isolation system is described in the context of a seat isolation system for attenuating and damping low frequency oscillations and/or shock loads that may propagate from a chassis of the vehicle to the seat. Isolation systems in accordance with embodiments of the present invention may attenuate or dampen not only vertical oscillations, but preferably horizontal (e.g., fore-and-aft and side-to-side) oscillations and shock loads as well.

As used herein, "low frequency" refers to those oscillations resulting from interaction of the vehicle with its environment, e.g., oscillations resulting from vehicle traversal of ground undulations, that may be transmitted through the vehicle to the operator. For purposes of explanation, such environmentally induced oscillations are typically about 20 Hertz (Hz) or less, and more typically, about 15 Hz or less. Such low frequency oscillations are thus distinguished from vehicle-originating vibration such as that caused by the engines, cutting decks, and other rotating mechanical members.

The term "isolate" is used herein to describe a substantially reduced or attenuated dynamic output (e.g. lateral seat displacement, velocity, or acceleration) for a given dynamic input (e.g. a lateral vibration or shock load resulting from movement of the chassis of the vehicle). Moreover, the terms "dissipate," "dampen," and the like are used herein to indicate the dispersion or dissipation of energy (e.g. a low frequency oscillation or shock load), typically through deflection of an isolation member.

FIG. 1 illustrates a vehicle incorporating an isolation system 200 in accordance with one embodiment of the present invention. For brevity, the vehicle is described and illustrated herein as a zero-radius-turning (ZRT) power riding lawn mower 100. However, while described herein with respect to a seat isolation system for a particular mower, those of skill in the art will realize that embodiments of the invention are equally applicable to other types of riding mowers, as well as to most any other type of riding (e.g., skid steer loader, earth moving equipment, forklift, etc.) or non-riding utility vehicle wherein isolation of low frequency oscillations and shock loads is desired, e.g., for purposes of improving comfort at the operator interface.

Moreover, isolation systems in accordance with embodiments of the present invention are applicable to not only other seating (e.g., passenger) applications, but to non-seat applications as well. For example, most any application wherein isolation of low frequency oscillations and shock loads between a first and second member may be addressed by embodiments of the instant invention. Such systems could thus, for example, be used between a frame and a standing platform of a vehicle, or between a frame and hand controls of a walk-behind vehicle.

FIG. 1 illustrates the exemplary vehicle, e.g., mower 100, having underlying structure (a mower frame or chassis 102) that supports a prime mover, e.g., internal combustion engine 104. A pair of transversely opposing, ground engaging drive members, e.g., drive wheels 106 (only left wheel visible in FIG. 1) may support the mower 100 in driving engagement with a ground surface 107. Other ground engaging members, e.g., castoring or steerable front wheels 108, may support the front of the mower as shown. Each drive wheel 106 may be powered by a hydrostatic motor (not shown) which receives power from a hydraulic pump under the control of an operator. The hydraulic pump, in turn, may be powered by the engine 104. Other wheel drive systems (e.g., mechanical systems) and drive configurations (e.g., tri-wheel) are also possible without departing from the scope of the invention.

An implement, e.g., cutting deck 114, may be attached generally between the front and rear wheels as shown in what is commonly referred to as a mid-mount configuration. The cutting deck 114 may include one or more cutting blades (not shown) as is known in the art. During operation, power is selectively delivered to the blades of the cutting deck 114 by the engine, whereby the blades rotate at a speed sufficient to cut grass and other vegetation over which the deck passes.

To accommodate the sifting operator, the mower 100 may further include a seat 110 defining an upper seating surface for a seated operator. Various controls, e.g., ZRT drive control levers 111, may be accessed by the operator from the seat during operation. In the illustrated embodiment, the mower 100 includes what is often referred to as a twin lever control system wherein left and right control levers 111 control, respectively, the left and right drive wheels 106. Accordingly, mower speed and direction may be controlled by selective manipulation of the two drive control levers 111.

As used herein, relative terms such as "left," "right," "fore," "forward," "aft," "rearward," "top," "bottom," "upper," "lower," "horizontal," "vertical," and the like are, if used, from the perspective of one operating the mower 100 while the mower is in an operating configuration, e.g., while the mower 100 is positioned such that the wheels 106, 108, rest upon the generally horizontal ground surface 107 as shown in FIG. 1. These terms are used herein only to simplify the description, however, and not to limit the scope of the invention in any way.

Figure 2:
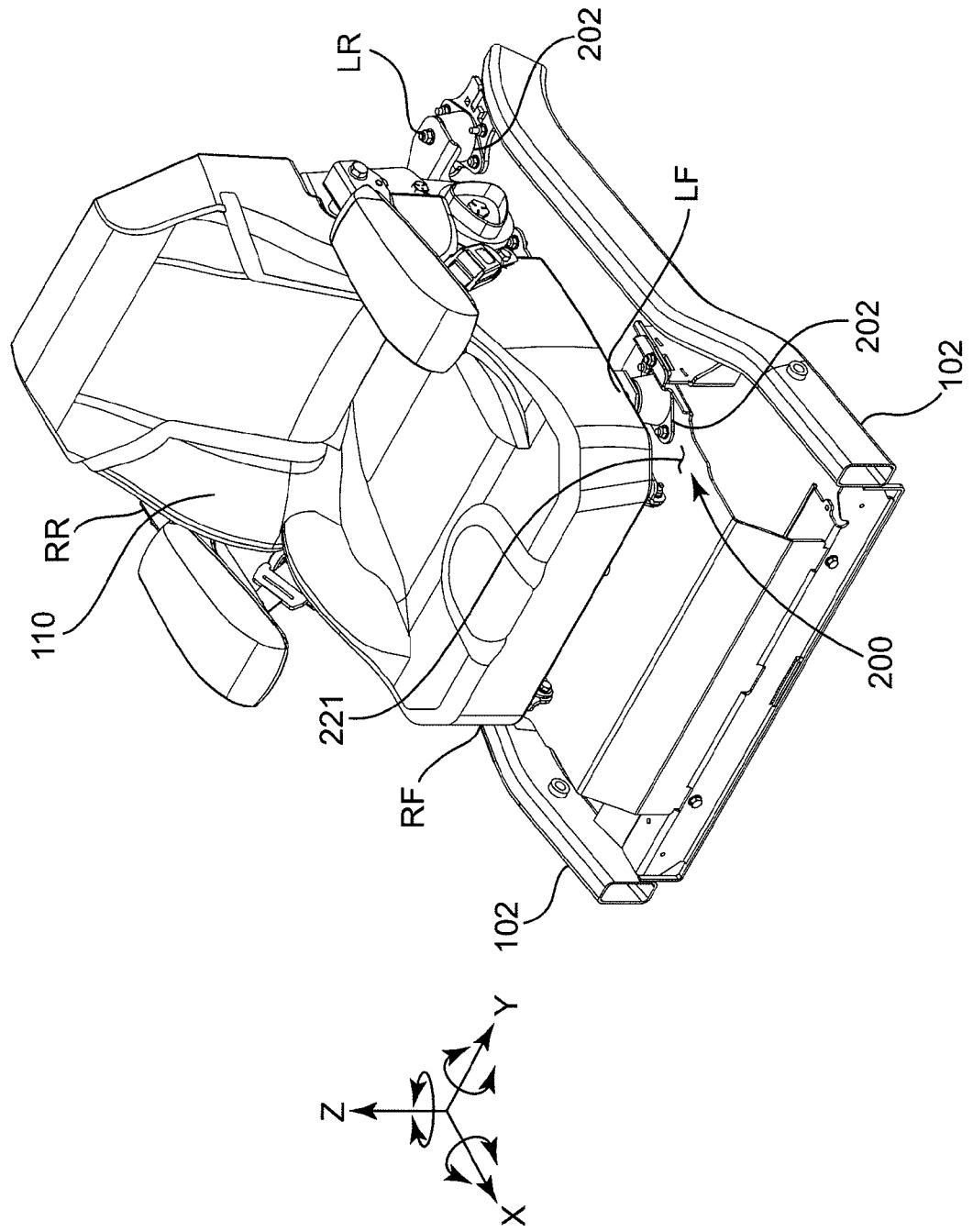
FIG. 2 is an upper left front perspective view of the seat and isolation system of FIG. 1, wherein two left isolators of the system are visible.

FIG. 2 is an enlarged left front perspective view of the seat 110 and part of the chassis 102. This view also partially illustrates an isolation system, e.g., seat isolation system 200, in accordance with one embodiment of the invention. As illustrated in this view, the seat isolation system 200 may include two or more isolators 202 interposed between a first member (e.g., a receiving surface of the seat 110) and a second member (e.g., an attachment surface 221 of the chassis 102). In the illustrated embodiment, four isolators 202 are provided (two isolators 202 on the left side at locations LF and LR, and two isolators 202 similarly located on the right side at locations RF and RR). However, other embodiments may include more or less (e.g., two) isolators without departing from the scope of the invention. The configuration of the system 200 and each isolator 202 may be generally the same (e.g., the right side views corresponding to the left side views of FIGS. 2, 4, 5, and 6 are generally mirror images of those respective figures) and, as a result, the right side isolators are not separately illustrated in detail herein.

The reference identifiers LF ("left front"), RF ("right front"), LR ("left rear"), and RR ("right rear") may be used throughout this description to denote the exemplary locations of the isolators 202. These locations are taken from the perspective of one sitting in the seat 110 during mower operation. Unless otherwise noted, the description of an individual isolator (e.g., the isolator at location LF) also applies to the other isolators (e.g., the isolator at location RR).

Figure 3:
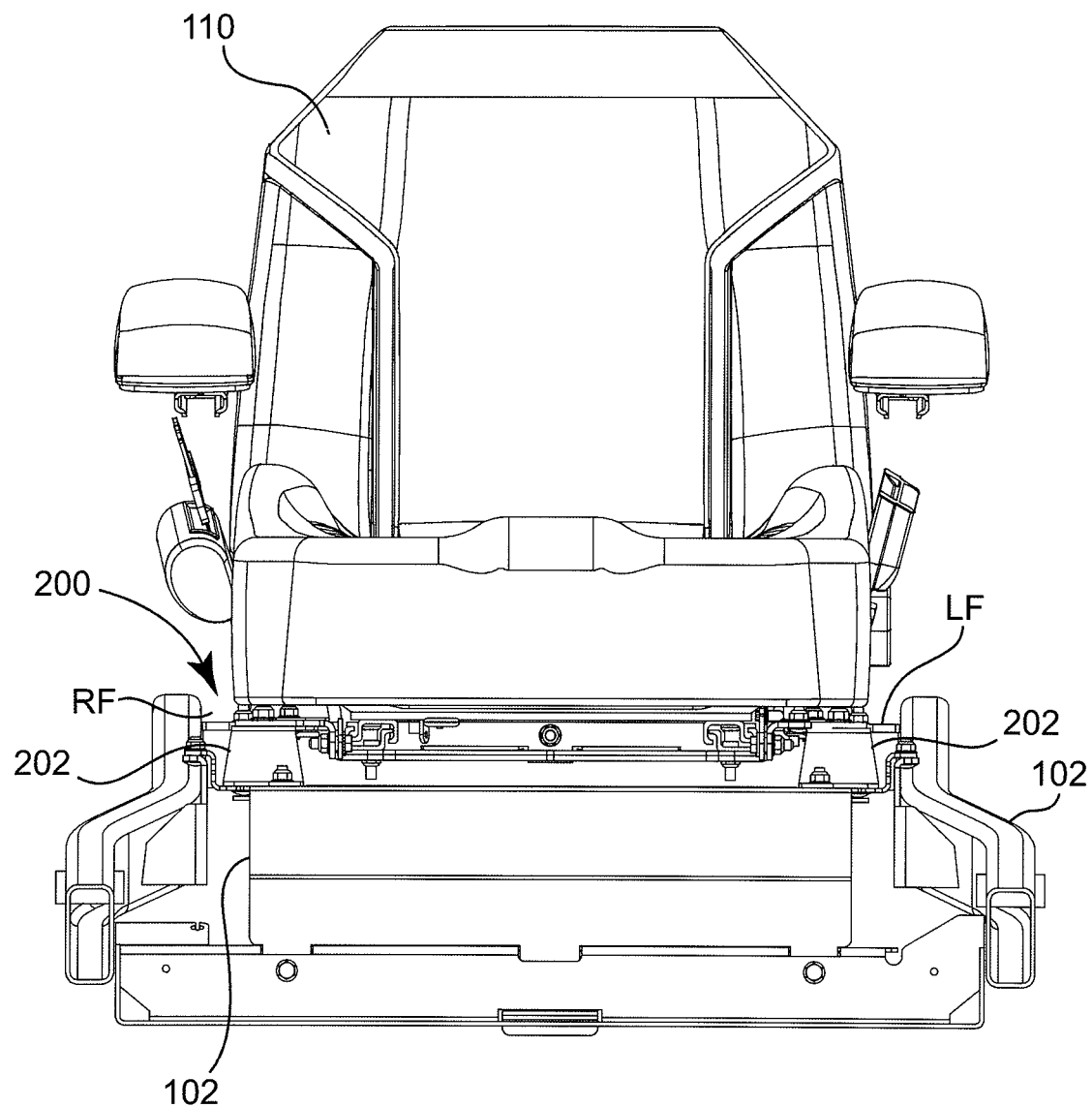
FIG. 3 is a front elevation view of the seat and isolation system of FIG. 1.

FIG. 3 is a front elevation view of the seat 110, the isolation system 200, and portions of the chassis 102. The isolators 202 at the LF and RF locations are clearly illustrated in this view.

Figure 4:
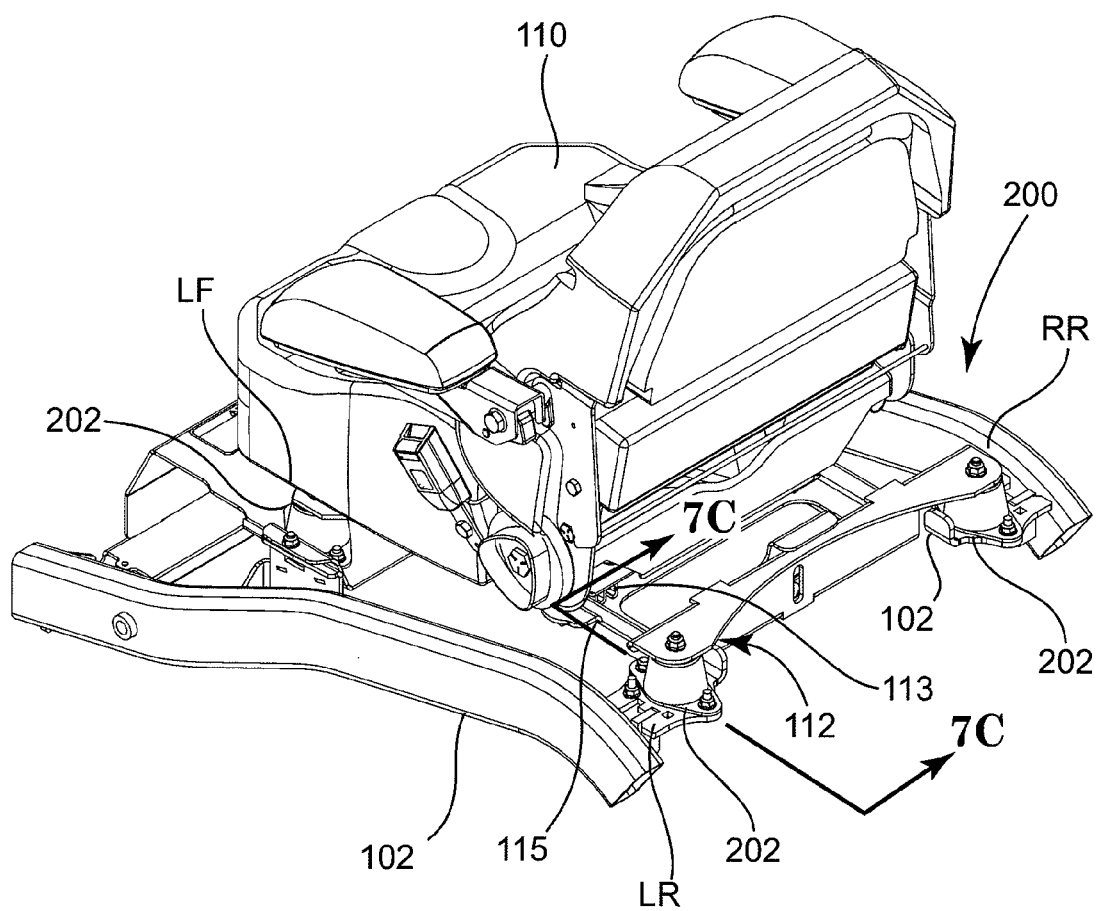
FIG. 4 is an upper left rear perspective view of the seat and isolation system of FIG. 1.

FIG. 4 is a left rear perspective view of the seat 110, local portions of the chassis 102, and the system 200. As shown in this view, the seat 110 may be attached to a seat frame 112. In some embodiments, the seat frame 112 may be integral and fixed with the seat, while in other embodiments, the seat frame may form a mechanism that permits adjustment of the seat relative to the chassis 102. For example, the seat frame 112 may include rails 113 rigidly attached or secured to the seat, and rails 115 that are operatively attached or secured to the chassis 102, e.g., to the isolators 202. The rails 113 (and thus the seat) may selectively move or translate along the rails 115 (e.g., in the fore-and-aft direction) and ultimately lock relative to the rails 115, to accommodate operators of varying heights.

Figure 5:
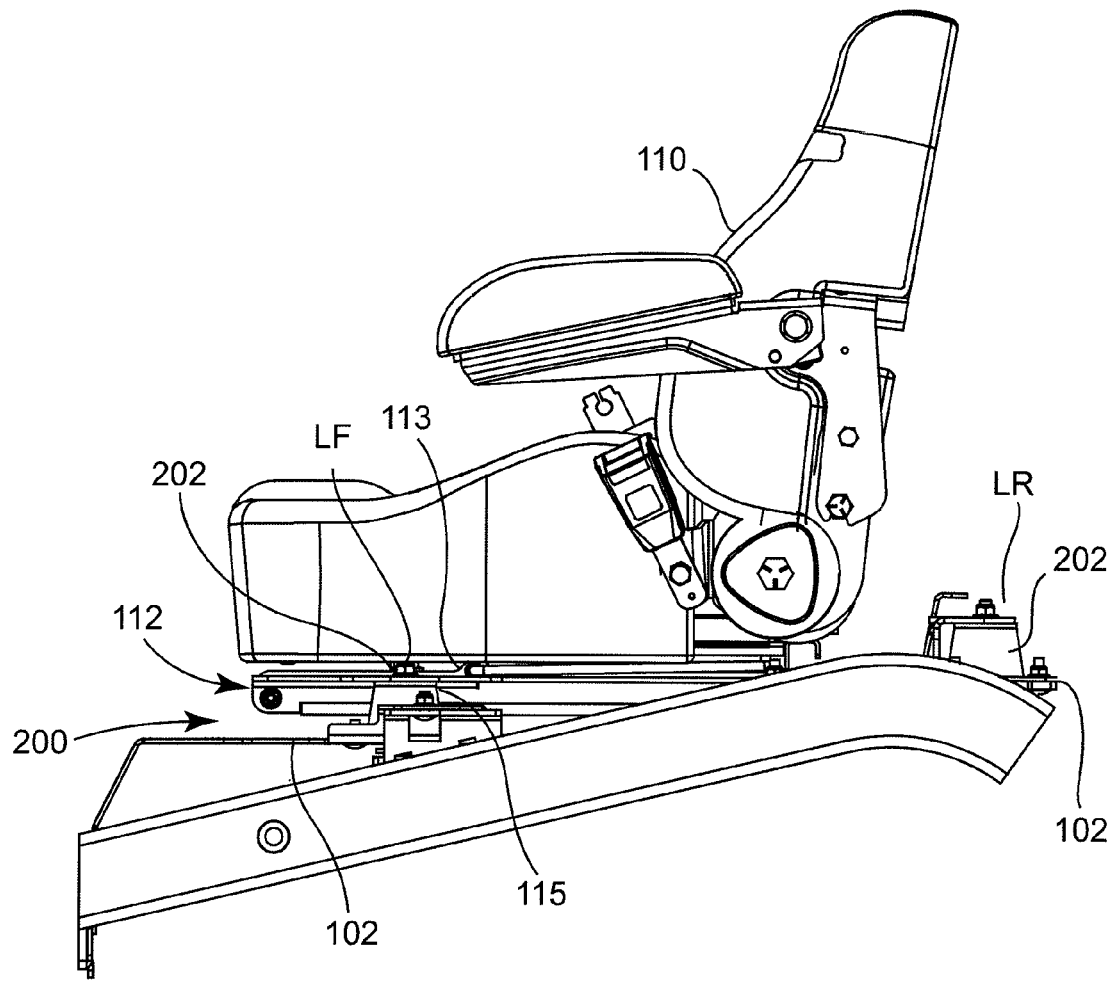
FIG. 5 is a left side elevation view of the seat and isolation system of FIG. 1.

FIG. 5 is a left side elevation view clearly illustrating the seat 110, e.g., the seat frame 112, the chassis 102, and the isolators 202 at locations LF and LR interposed therebetween. As shown in this view, the rear isolators 202 (e.g., the isolators at locations LR and RR in FIG. 4) may, in some seat positions, be located aft of the actual seat 110. This configuration provides not only a rail length sufficient to accommodate the desired seat movement, but also spaces the isolators sufficiently far apart to allow some degree of pivotal seat motion as further described below.

Figure 6:
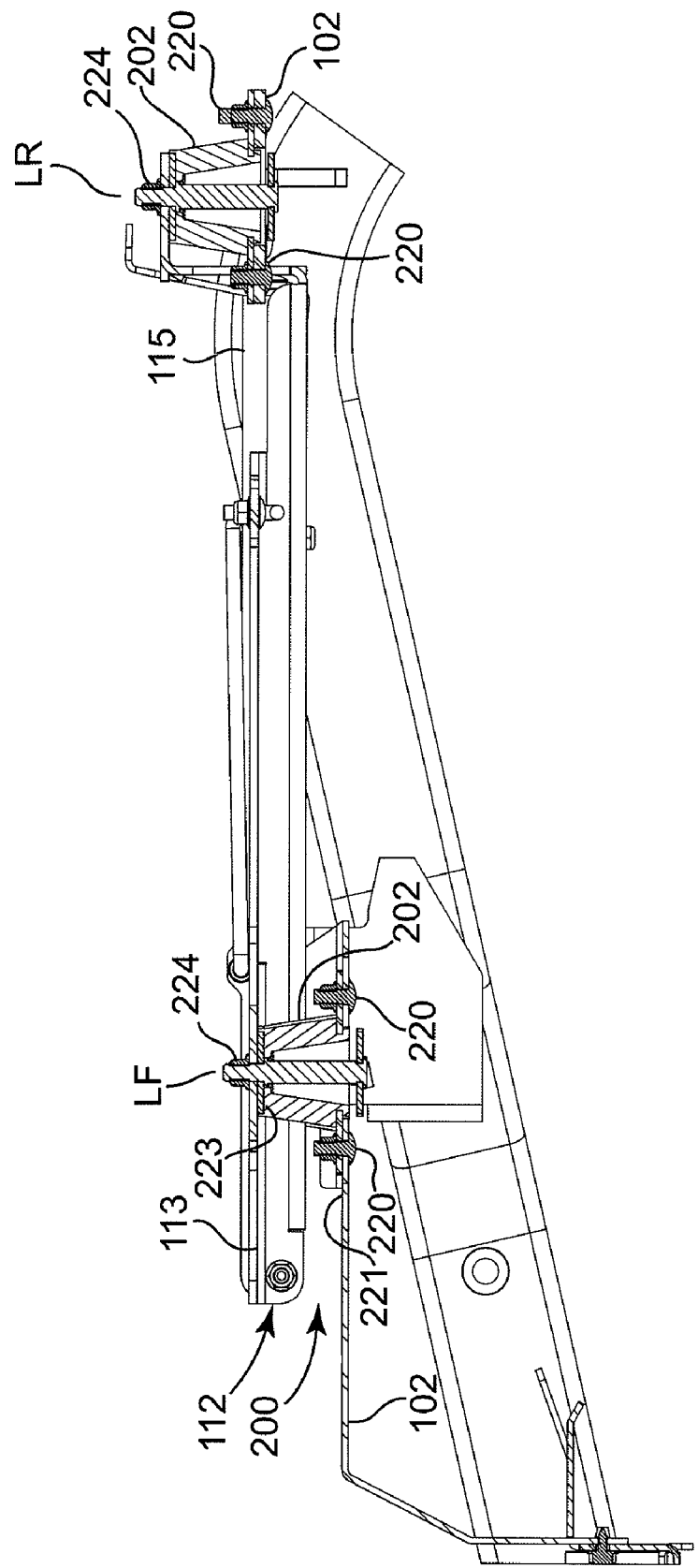
FIG. 6 is a partial section view of the system of FIG. 1 taken along a longitudinal vertical plane bisecting the left isolators, wherein the left front isolator is rotated for illustration purposes.

FIG. 6 is a partial section view taken along a longitudinal vertical plane extending through the isolators 202 at locations LF and LR (note that the seat is removed in this view and that the isolator at location LF is rotated from its true orientation (see FIG. 2) to provide a more illustrative section view). As clearly shown in this view, each isolator 202 may be attached at a lower end to the chassis 102 and, at an upper end, to the seat frame 112 (e.g., to the rails 115).

Figure 7D:
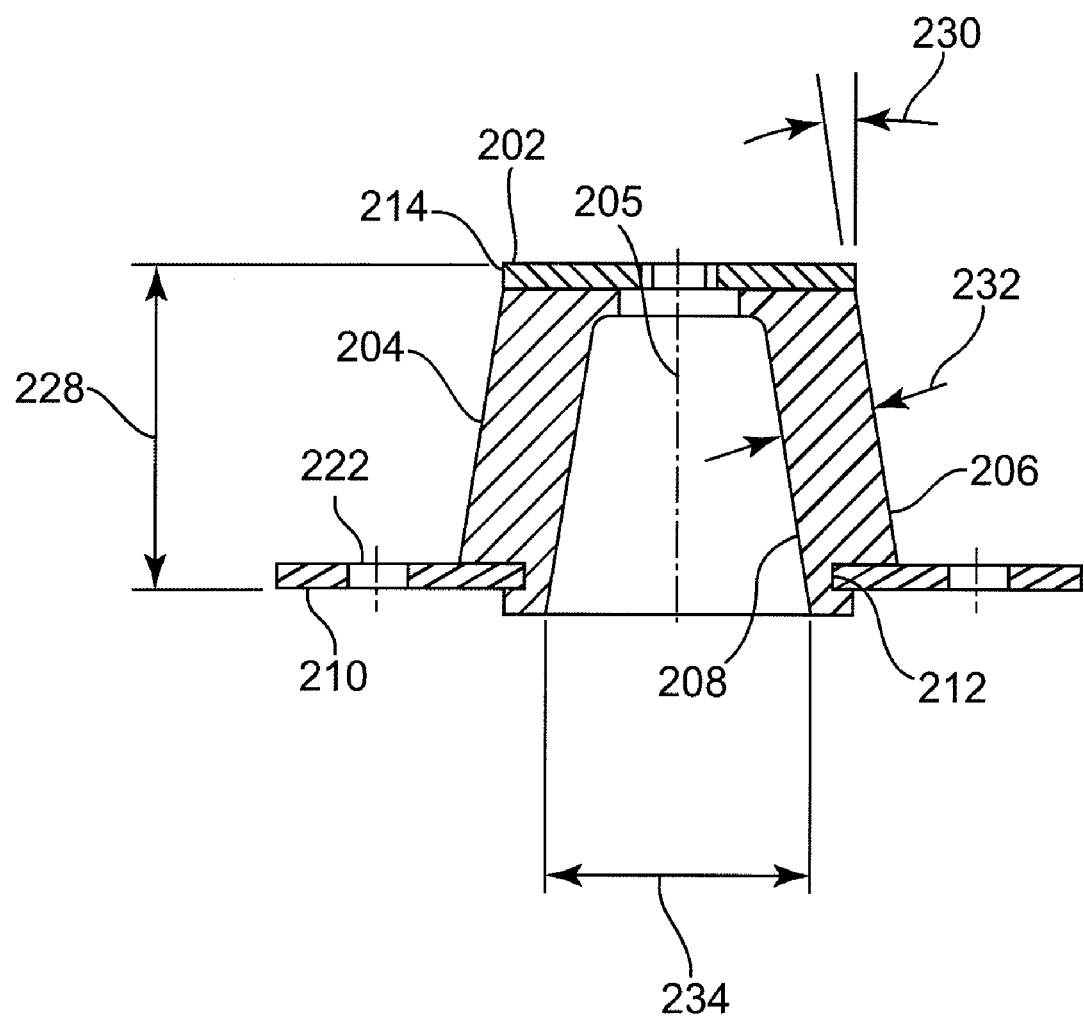

FIGS. 7A-7D further illustrate the exemplary isolator 202, wherein: FIG. 7A is a perspective view; FIG. 7B is a top plan view; FIG. 7C is a section view taken along line 7C-7C of FIG. 4 (a partial view similar to that included in FIG. 6); and FIG. 7D is a another section view of the isolator. FIGS. 7A, 7B, and 7D show the isolator as removed from the mower 100.

Each isolator 202 may include an elastomeric tubular body 204. The body 204 may form the isolation mechanism that attenuates and dampens low frequency oscillations and shock loads during mower operation. In one embodiment, the body 204 is unitary and tapered or frusto-conical in shape, e.g., it forms a tubular frustrum or truncated cone extending along a longitudinal or body height axis 205 of the body as shown in FIG. 7D. In addition to the tapered outer surface 206, the body may further include, at least in one embodiment, an inner surface 208 (see FIG. 7C) that is tapered to the same degree as the outer surface. Such a configuration may provide the body 204 with a uniform thickness over a substantial portion of its longitudinal (vertical) height.

In the illustrated embodiment, each isolator 202 may have a longitudinal axis (e.g., axis 205 of FIG. 7D) that is parallel to the longitudinal axis of the other isolators. That is, the isolators are, at least in one embodiment, parallel to one another. Moreover, each axis 205 may be oriented to be vertical as shown in FIGS. 6 and 7C, e.g., perpendicular to the ground surface 107 (see FIG. 1).

To allow attachment of the isolator 202 to mower structure, a base flange 210 may be provided. In one embodiment, the base flange 210 defines a central opening that engages a groove 212 formed in a lower portion of the body 204 as shown in FIG. 7C. A washer 214 may also be provided near the opposite, e.g., top, end of the body 204. A stud 216 may pass through the body 204, base flange 210, and washer 214 as shown. A retaining ring 218 may secure the stud 216 and washer 214 relative to the body 204 and base flange 210 to form the assembly 201 as shown in FIG. 7A. The stud 216 may further include a flange 226 that abuts the lower side of the washer 214 as shown in FIG. 7C.

To install the isolation system 200, each isolator assembly 201 (see FIG. 7A) may be located at its intended location (e.g., at an attachment surface 221 shown in FIG. 7C) on the chassis 102. Fasteners 220 (e.g., bolt and nut) may then be passed through openings 222 in the base flange 210 that align with corresponding openings in the chassis 102. The seat 110 (e.g., rail 115) may form one or more receiving surfaces (e.g., surface 223 of FIG. 7C) positionable proximate to, and offset from, the attachment surface(s) of the chassis 102 such that an upper threaded end of the stud 216 (see FIGS. 7A and 7C) extends through a receiving opening in the surface 223. The receiving surfaces 223 may, in one embodiment, be parallel to, and offset from, the respective attachment surfaces 221 of the chassis. A nut 224 may then be used to secure the rail 115 to the isolator 202, e.g., against the washer 214. The flange 226 may allow the nut 224 to be effectively tightened against the rail 115 and washer 214 as shown.

The stud 216 may also include a flange 219 integral with or otherwise attached to the lower end. The flange 219 may provide a mechanical stop in the event the isolator is inadvertently exposed to excessive tension. In the illustrated embodiment, the flange 219 may have a diameter that is larger than the diameter of the opening formed by the base flange 210 (see FIG. 7C). Thus, in the event that excessive tension is applied to any of the isolators that results in axial elongation of the isolator beyond a predetermined threshold, the flange 219 of the stud 216 may contact the base flange 210. Stated alternatively, the flange of the stud may serve as a stop member that limits excessive axial elongation of the isolator, and thus limits (or substantially prevents) unintentional separation of the seat from the chassis 102. In a similar fashion, in the event that excessive horizontal (e.g., radial) loading is applied to any of the isolators, the stud 216 itself may also function as a stop member to limit deflection of the isolator in the horizontal direction, e.g., when it comes into contact with the inside diameter of flange 210. In either case (e.g., horizontal and axial loading), the stop member (e.g., stud 216 or flange 219) may be cushioned partially by portions of the body 204 present at the contact areas (e.g., rubber portions of the body 204 that are interposed between the stud 216/base flange 210 and flange 219/base flange).

During vehicle operation, low frequency oscillations and shock loads that are transmitted through the chassis 102 may be attenuated and dampened by the isolators 202, thereby attenuating the amplitude of oscillations affecting the seat. Unlike conventional seat suspension systems that have limited degrees of freedom, the exemplary isolation system 200 may provide six degrees of freedom (translation of the seat, relative to the chassis, about three mutually perpendicular axes, e.g., axes x, y, and z (see FIG. 2), as well as pivoting of the seat, relative to the chassis, about the x (e.g., "roll"), y (e.g., "pitch"), and z (e.g., "yaw") axes). The rotational capability of the system 200 is at least partially attributable to adequate spacing provided between the respective isolators 202 and the ability of each isolator to elastically deform in most any direction (e.g., twist and translate about all three axes).

While not wishing to be bound to any particular configuration, the system 200 may, in one embodiment, include isolators configured as shown in FIG. 7D (stud 216 removed from this view for clarity). In this exemplary embodiment, the isolator may have an overall height 228 of about 1.8 to about 2 inches. Further, the body 204 may be constructed of an elastomeric material that conforms to the ASTM D2000 rubber specification (e.g., neoprene) having a durometer of about 30 Shore A to about 40 Shore A. The taper angle 230 of the body 204 may be about 7-12 degrees, e.g., about 9 degrees. Once again, this taper angle may be substantially the same along both the outer surface 206 and the inner surface 208, yielding a wall thickness 232 of about 0.54 inches. The body 204 may further taper along its outer surface 206 from a first diameter (measured immediately above the base flange 210) of about 2.5 inches to a second smaller diameter (measured immediately below the washer 214) of about 2 inches (e.g., the body tapers to a smaller diameter towards the seat). The inner surface 208 of the body may also have a diameter 234 measured at the bottom face of the body of about 1.5 inches. Once again, this exemplary configuration is not limiting as isolators of other sizes, materials, shapes, and orientations (e.g., inverted such that the isolator tapers to a smaller diameter towards the chassis) may certainly be utilized without departing from the scope of the invention.

The construction of the exemplary isolator 202 may permit radial (e.g., horizontal) translation of a first member (e.g., the upper washer 214 and/or the seat 110) relative to a second member (e.g., the base flange 210 and/or the chassis 102) in any radial direction of about 0.62 inches. Correspondingly, the exemplary isolator 202 may permit axial (e.g., vertical) travel of the upper washer 214 downwardly towards the base flange 210 of about 0.62 inches (see FIG. 7D). These ranges of travel are limited mainly by the clearance provided between the stud 216/flange 219 and the base flange 210.

In addition to providing pure translation along the three principal axes (x, y, and z as shown in FIG. 2), the configuration of the elastomeric body 204 (e.g., the frusto-concial shape) may also permit rotation of the first member, e.g., upper washer 214, relative to the second member, e.g., base flange 210, about the three principal axes. As a result, each isolator 202 may provide six degrees of freedom.

While not wishing to be bound to any particular embodiment, each isolator 202 may be configured to provide an axial (e.g., vertical) stiffness of about 300 pounds-force/inch (lbf/in) to about 550 lbf/in, preferably about 300 lbf/in to about 400 lbf/in, and a corresponding radial (e.g., horizontal) stiffness of about 25 lbf/in to about 125 lbf/in, preferably about 25 lbf/in to about 75 lbf/in. For instance, in one embodiment using a 30 durometer (Shore A) neoprene material, each isolator 202 may have an axial or vertical stiffness of about 360 lbf/in and a radial or horizontal stiffness of about 70 lbf/in. In another embodiment using a 40 durometer (Shore A) material, each isolator may have an axial or vertical stiffness of about 515 lbf/in and a radial or horizontal stiffness of about 100 lbf/in. In these exemplary embodiments, each isolator 202 (and thus the isolation system 200) may yield an axial (e.g., vertical) stiffness that is about 4 more times greater than its radial (e.g., horizontal) stiffness. For example, each isolator may provide a ratio of axial (e.g., vertical) stiffness to radial (e.g., horizontal) stiffness of about 4:1 to about 6:1, e.g., about 5:1 to about 5.2:1.

By providing isolators 202 having an exemplary construction (e.g., geometry and stiffness characteristics) as described herein, isolator systems in accordance with embodiments of the present invention may permit translation of a first member (e.g., the seat 110) relative to a second member (e.g., the chassis 102) in either the radial direction (e.g., in any horizontal direction) or the axial (e.g., vertical direction) of about 0.62 inches. Moreover, by providing multiple isolators, the system 200 may yield stiffness properties that vary as a multiple of the individual isolators. For instance, in one embodiment, a system 200 configured as shown and described herein (e.g., using four substantially identical frusto-conically shaped isolators 202 made from a 30 durometer (Shore A) neoprene material that are configured as shown and described herein) may provide an axial or vertical stiffness of about 1200 lbf/in to about 1600 lbf/in, e.g., about 1440 lbf/in, and a radial or horizontal stiffness of about 100 lbf/in to about 300 lbf/in, e.g., about 280 lbf/in.

Isolation systems 200 in accordance with embodiments of the present invention may also provide a low natural frequency in the horizontal direction, and thus may attenuate and dampen various low frequency horizontal oscillations and shock loads emanating from the vehicle chassis. For instance, the isolation system 200 as shown and described herein may, with an operator sitting in the seat, provide a natural frequency in any radial (e.g., horizontal) direction of about 3.5 Hz to about 4.5 Hz for an operator weighing, respectively, about 245 lbf and about 130 lbf. For a more typical operator weighing about 175 lbf, the system 200 may provide a natural frequency of about 4 Hz in any radial (e.g., horizontal) direction. The system 200 may be capable of isolating those frequencies that are about 1.4 times greater than the natural frequency of the system (assuming a typical sinusoidal oscillation). Thus, an operator sitting in the seat 110 may be substantially isolated from horizontal forcing frequencies emanating from the vehicle chassis that are equal to or greater than about 5 Hz to about 6.3 Hz, e.g., equal to or greater than about 5.6 Hz.

While capable of isolating a large spectrum of oscillation frequencies greater than these stated values, systems in accordance with embodiments of the present invention are primarily designed to address oscillations in the low frequency spectrum, e.g., those about 20 Hz or less. Thus, isolation systems in accordance with embodiments of the present invention may be considered to isolate radial or horizontal oscillations in the range of about 5 Hz to about 20 Hz, e.g., dissipate oscillations in the horizontal plane that are within this range and that may otherwise propagate from the chassis to the seat.

Correspondingly, although stiffer in the vertical direction, isolation systems in accordance with embodiments of the present invention may further provide a low natural frequency in the vertical direction, and thus may also attenuate and dampen low frequency vertical oscillations and shock loads. For instance, the exemplary isolation system 200 may yield a natural frequency in the axial or vertical direction of about 8 Hz for a 245 lbf operator to about 10 Hz for a 130 lbf operator (e.g., about 9 Hz for a 175 lbf operator). Thus the system may isolate the operator from vertical forcing frequencies emanating from the vehicle chassis that are equal to or greater than about 11 Hz to about 14 Hz (e.g., equal to or greater than about 12.5 Hz). Thus, isolation systems in accordance with embodiments of the present invention may be considered to isolate axial or vertical oscillations in the range of about 11 Hz to about 20 Hz, e.g., dissipate oscillations in the vertical direction that are within this range and that may otherwise propagate from the chassis to the seat.

Moreover, it is generally understood that a seated human being has maximum sensitivity to oscillations of about 4-8 Hz in the vertical direction and about 1-2 Hz in the horizontal direction (due to similar corresponding natural frequencies of tissue in these same directions). Thus, an isolation system configured to provide the seat with natural frequencies as low as possible, yet outside of these ranges of maximum sensitivity, may effectively lessen operator exposure to oscillations within these particular ranges, which may ultimately improve operator comfort.

While described herein as utilizing four separate isolators of generally identical construction, this configuration is not limiting. For instance, other embodiments may alter the number of isolators, as well as the configuration of each individual isolator (e.g., to tune the stiffness and corresponding natural frequency of the isolator in each direction) to achieve particular system response characteristics as desired for specific applications.

Illustrative embodiments of this invention are discussed and reference has been made to possible variations within the scope of this invention. These and other variations, combinations, and modifications of the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. An isolation system for isolating a first member from a second member, the system comprising one or more isolators interposed between the first member and the second member, each isolator comprising an elastomeric body, the isolation system defining an axial stiffness and a radial stiffness of a different value than the axial stiffness, wherein the radial stiffness of the isolation system is about 100 pounds-force/inch to about 300 pounds-force/inch, and wherein the isolation system provides: translation of the first member, relative to the second member, along three mutually perpendicular axes; and pivoting of the first member, relative to the second member, about each of the three perpendicular axes.

2. The system of claim 1, wherein the one or more isolators comprise at least two isolators.

3. The system of claim 2, wherein each isolator defines a longitudinal axis, the longitudinal axes of all the isolators being parallel to one another.

4. The system of claim 1, wherein the isolator further comprises a stop member configured to limit one or both of axial elongation and radial deflection of the isolator.

5. The system of claim 4, wherein the stop member is configured to limit one or both of the axial elongation and the radial deflection by contacting the stop member with a surface of the elastomeric body of the isolator.

6. The system of claim 1, wherein the axial stiffness of the isolation system is about 4 or more times greater than the radial stiffness.

7. The system of claim 1, wherein the axial stiffness of the isolation system is about 1200 pounds-force/inch to about 1600 pounds-force/inch.

8. The system of claim 1, wherein the isolation system provides a natural frequency of about 3.5 Hz to about 4.5 Hz in a radial direction.

9. The system of claim 1, wherein the first member is a seat and the second member is a chassis of a vehicle.

10. A vehicle comprising:
a chassis supporting a prime mover operatively powering one or more drive wheels, the chassis comprising three or more attachment surfaces;
a seat comprising: an upper seating surface; and a lower receiving surface proximate the attachment surfaces of the chassis; and
a seat isolation system comprising an isolator interposed between each attachment surface of the chassis and the receiving surface of the seat, each isolator comprising a unitary, elastomeric body, wherein a stiffness of the seat isolation system in all horizontal directions is about 100 pounds-force/inch to about 300 pounds-force/inch, and further wherein the seat isolation system is configured to: permit translation of the seat relative to the chassis in the horizontal directions; and dissipate oscillations in the horizontal directions of about 5 Hz to about 20 Hz that would otherwise propagate to the upper seating surface.

11. The vehicle of claim 10, wherein the seat isolation system has a ratio of stiffness in a vertical direction to the stiffness in the horizontal directions of about 4:1 to about 6:1.

12. The vehicle of claim 11, wherein the seat isolation system has a stiffness in a vertical direction of about 1200 pounds-force/inch to about 1600 pounds-force/inch.

13. The vehicle of claim 10, wherein the seat isolation system dissipates oscillations in a vertical direction ranging from about 11 Hz to about 20 Hz.

14. The vehicle of claim 10, where each isolator tapers to a smaller outer diameter towards the seat.

15. A riding lawn mower comprising:
a mower chassis supporting a prime mover operatively powering one or more drive wheels and a cutting deck, the chassis comprising four attachment surfaces;
a seat comprising a receiving surface proximate to, and offset from, each of the attachment surfaces of the chassis; and
a seat isolation system comprising an isolator interposed between each attachment surface of the chassis and the corresponding receiving surface of the seat, wherein each isolator comprises a unitary, elastomeric tubular body, and wherein the seat isolation system is configured to dissipate oscillations in a horizontal plane ranging from about 5 Hz to about 20 Hz that would otherwise propagate from the chassis to the seat, and wherein the isolation system provides: translation of the seat, relative to the chassis, along three mutually perpendicular axes; and pivoting of the seat, relative to the chassis, about each of the three perpendicular axes.

16. The mower of claim 15, wherein a position of the seat is adjustable relative to the isolators.

17. The mower of claim 15, wherein the isolation system is configured to: permit translation of the seat relative to the chassis, in any horizontal direction, a distance of up to about 0.62 inches.

18. The mower of claim 15, wherein the seat isolation system defines a natural frequency in the horizontal plane of about 3.5 Hz to about 4.5 Hz.

19. The mower of claim 16, wherein the seat isolation system has a ratio of vertical stiffness to horizontal stiffness of about 4:1 to about 6:1.

20. The mower of claim 15, wherein each isolator further comprises a stop member to limit one or both of axial elongation and horizontal deflection of the isolator.

21. The mower of claim 15, wherein each isolator comprises a longitudinal axis that is oriented vertically.

22. A riding lawn mower comprising:
a mower chassis supporting a prime mover operatively powering one or more drive wheels and a cutting deck, the chassis comprising four attachment surfaces;

a seat comprising a receiving surface proximate to, and offset from, each of the attachment surfaces of the chassis; and a seat isolation system comprising an isolator interposed between each attachment surface of the chassis and the corresponding receiving surface of the seat, wherein each isolator comprises a unitary, elastomeric tubular body, the seat isolation system defining a vertical stiffness of about 1200 pounds-force/inch to about 1600 pounds-force/inch, and a horizontal stiffness of about 100 pounds-force/inch to about 300 pounds-force/inch, wherein the system is configured to: permit translation of the seat relative to the chassis, in any horizontal direction, a distance of up to about 0.62 inches; and dissipate oscillations in any horizontal direction ranging from about 5 Hz to about 20 Hz that would otherwise propagate from the chassis to the seat.

23. The mower of claim 22, wherein the seat isolation system is configured to dissipate oscillations in a vertical direction ranging from about 11 Hz to about 20 Hz that would otherwise propagate from the chassis to the seat.

* * * * *